J. C. ANDERSON,
& A. W. BENSON.
RUNNING-GEAR FOR CARRIAGES
No. 118093          Patented Aug 15 1871
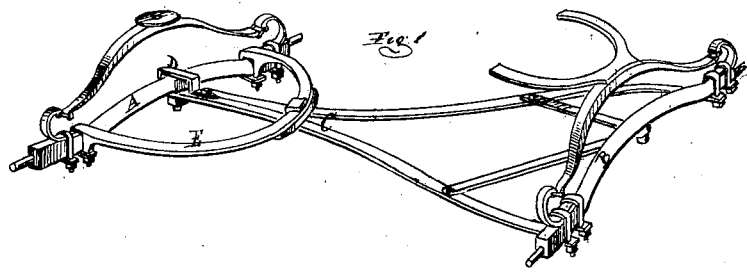
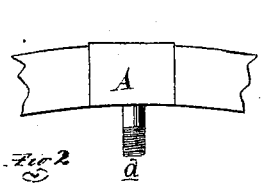
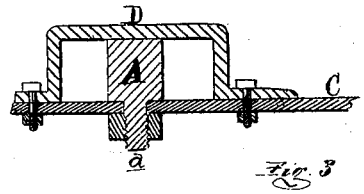
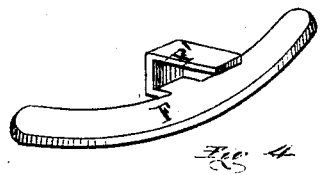
ATTEST
H. F. Eberts
Wyrice H. Church
INVENTORS
J. C. Anderson,
A. W. Benson,
per Attorney
Thos. S. Sprague 118,094

UNITED STATES PATENT OFFICE.

FREDERICK A. BALCH, OF HINGHAM, WISCONSIN.

IMPROVEMENT IN GRAIN-SEPARATORS.

Specification forming part of Letters Patent No. 118,094, dated August 15, 1871.

*To all whom it may concern:*

Be it known that I, FREDERICK A. BALCH, of Hingham, in the county of Sheboygan and State of Wisconsin, have invented a new and useful Improvement in Grain-Separator; and I do hereby declare the following to be a full, clear, and exact description of the same, reference being had to the accompanying drawing, in which—

Figure 1 is a perspective view of my machine. Fig. 2 is a vertical longitudinal section of the same. Figs. 3 and 4 represent different modes of constructing the outer jacket of the machine.

My invention is designed principally for the purpose of separating cockle from wheat, though it may be employed for the separation of other grains of dissimilar size by means of a revolving cylinder provided with interior cells; and it consists: First, in the manner of constructing the cells which receive and take up the seeds to be removed. Second, in the manner of effecting the discharge of the cockle or other separated seeds.

I am aware that the separation of seeds of dissimilar size has been effected by means of revolving cylinders constructed with cells distributed over their interior surfaces, as shown in the separator patented to F. W. Mace, 29th June, 1869, and therefore I do not claim that mode of separation, broadly.

That others may understand my invention fully I will particularly describe it.

The separating-cylinders may be composed of two plates of metal, A *a*. The plate A is perforated over its entire surface, at close and regular intervals, with round or angular holes, say hexagonal, of proper dimensions to receive a kernel of the seed to be taken up. The plate *a*, at points immediately back of said holes, is depressed so as, in conjunction with the holes in plate A, to form cells B of proper depth to receive and hold each a kernel of the objectionable seed. The long trough C is suspended from the center shaft S, or in any other convenient way, and extends through said cylinder lengthwise.

When the mixed seeds are introduced to the interior of the cylinder A and the same is rotated, the cockle or other seed to be separated is gradually taken up one by one by the cells B and carried so far with the revolution of the cylinder that, upon falling out, they will be caught in the pan C. In this way every objectionable seed may be eliminated from the mass while passing from one end of the cylinder to the other. The grain enters the interior of the cylinder through the stationary spout and hopper D, and, if the cylinder is of considerable length, it may be set so as to have a slight downward inclination toward the tail end, though the natural tendency of all bodies to descend to the lowest position will cause the grain to descend toward the tail end, even though the inclination may be very slight. Around the tail end of the cylinder there is a series of large holes, *b*, through which the grain pours, as it reaches that part of the cylinder, into a trough and spout, E, and thence passes into the receptacle provided for it. The pan or trough C is suspended from the revolving shaft S of the cylinder, and it may have imparted to it, by means of the ratchet *r* and jolter *k*, a vibratory motion, which will cause a movement of the cockle toward the tail end of said pan. If the cylinder and pan are very long, however, said movement may not be sufficient to cause a free delivery of the cockle over the tail end of the pan C, which projects beyond the end of the cylinder for that purpose, and I therefore place a spiral flange or screw, F, upon the shaft S, to cause a forcible movement of the cockle in the pan toward the tail end of the same.

The bottom of the pan C may be weighted, as at W, if necessary, to keep it properly suspended. The depressions or indentations on plate *a*, immediately back of the cell-holes of plate A, may be punctured or made of wire-cloth, if desirable, to permit the escape of dust, &c., and said plate *a* may be made entirely detachable for the purpose of facilitating the cleansing of the apparatus. There are various ways in which this may be accomplished. The plate *a* may be made in sections hinged to the main cylinder A, or secured thereto by keys, catches, or other locking devices, as shown in Fig. 3, at *a'*, so that for purposes of repair or removal of dirt, &c., the outer jacket *a* may be readily removed from the cylinder A.

By constructing the cylinder A of material having sufficient thickness, as shown in Fig. 4, the cells will be of sufficient depth without in-